(12) United States Patent
Pereira et al.

(10) Patent No.: US 11,460,159 B2
(45) Date of Patent: Oct. 4, 2022

(54) LAMP POST WITH A FUNCTIONAL POLE MODULE WITH BRACKET

(71) Applicant: Schreder S.A., Brussels (BE)

(72) Inventors: Nuno Pereira, Carnaxide (PT); Oscar Velandia, Carnaxide (PT); Ricardo Janeiro, Queijas (PT); Daniel Sousa, Amadora (PT)

(73) Assignee: Schreder S.A., Brussels (BE)

( * ) Notice: Subject to any disclaimer, the term of this patent is extended or adjusted under 35 U.S.C. 154(b) by 183 days.

(21) Appl. No.: 16/763,537

(22) PCT Filed: Nov. 13, 2018

(86) PCT No.: PCT/EP2018/081062
§ 371 (c)(1),
(2) Date: May 12, 2020

(87) PCT Pub. No.: WO2019/092273
PCT Pub. Date: May 16, 2019

(65) Prior Publication Data
US 2020/0278096 A1    Sep. 3, 2020

(30) Foreign Application Priority Data

Nov. 13, 2017 (BE) .................................. 2017/5828

(51) Int. Cl.
*F21S 8/08* (2006.01)
(52) U.S. Cl.
CPC ...................................... *F21S 8/08* (2013.01)

(58) Field of Classification Search
CPC .......... F21S 8/08; F21S 8/085; G03B 17/561; F21V 33/0052
See application file for complete search history.

(56) References Cited

U.S. PATENT DOCUMENTS

2006/0044789 A1    3/2006 Curtis
2012/0143383 A1    6/2012 Cooperrider et al.

FOREIGN PATENT DOCUMENTS

GB          2337538 A     11/1999
JP          4418012 B1     2/2010
WO     WO-2016031976 A1 *  3/2016 ................ F21S 9/02

OTHER PUBLICATIONS

PCT International Search Report and Written Opinion, PCT International Application No. PCT/EP2018/081062, dated Dec. 17, 2018.

* cited by examiner

*Primary Examiner* — Karabi Guharay
(74) *Attorney, Agent, or Firm* — McDonnell Boehnen Hulbert & Berghoff LLP

(57) ABSTRACT

The invention relates to a lamp post comprising a support pole, and a plurality of pole modules arranged one above the other along a vertical axis of the support pole, and supported by the support pole; said plurality of pole modules comprising: a light pole module and a functional pole module; said light pole module comprising a light source; said functional pole module comprising a tubular portion configured for being aligned with the vertical axis of the support pole, a bracket protruding outwardly of said tubular portion, and a functional unit fixed to said bracket; wherein preferably the functional unit is a camera unit.

19 Claims, 14 Drawing Sheets

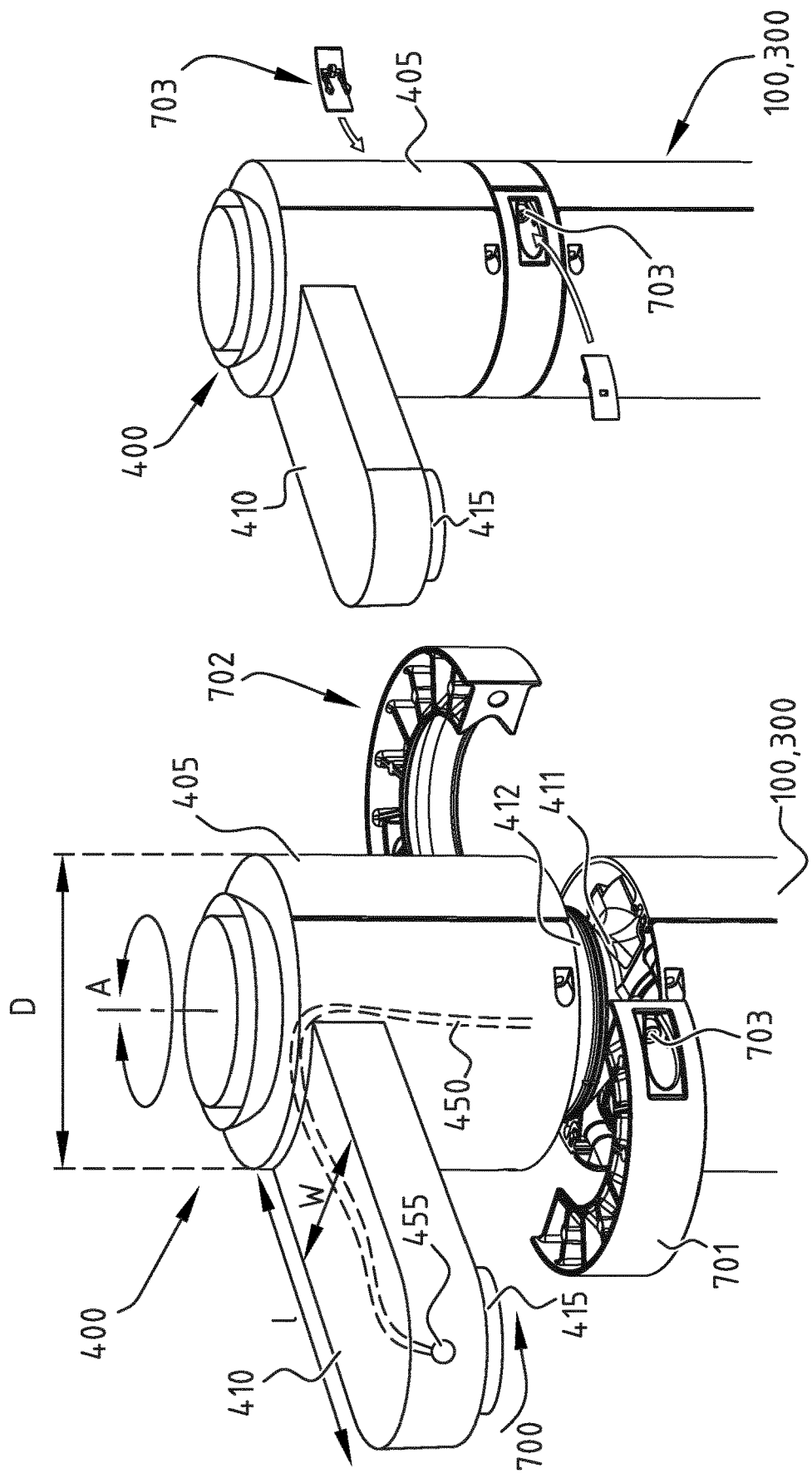

LAMP POST WITH A FUNCTIONAL POLE MODULE WITH BRACKET

CROSS-REFERENCE TO RELATED APPLICATION

The present application is a national stage entry of PCT/EP2018/081062 filed on Nov. 13, 2018, which claims priority to BE 20175828 filed on Nov. 13, 2017, the contents of each of which are hereby incorporated by reference.

FIELD OF INVENTION

The field of the invention relates to lamp posts, in particular lamp posts in the form of outdoor luminaires. Particular embodiments relate to the field of modular lamp posts comprising a number of functional pole modules. Other embodiments relate to a functional pole module for use in such modular lamp posts, and in particular a functional pole module comprising a camera.

BACKGROUND

EP 3 076 073 B1 in the name of the applicant discloses a modular lamp post which is readily assembled and installed in the field whilst providing rigidity, structural integrity and sealing. The lamp post comprises a plurality of pole modules mounted on a support pole. The pole modules are connected to one another by respective pole module connectors and one pole module thereof is connected to the support pole by a pole module connector. EP 3 076 073 B1 is included herein by reference.

Further it is known to include additional functionalities, either in the modular lamp post itself or in a separate cabinet adjacent a lamp post.

SUMMARY

The object of embodiments of the invention is to provide a functional pole module with a functional unit, such as a camera unit, which can be easily integrated in the modular lamp post and which allows the functional unit to be positioned at a certain distance of a vertical axis of the lamp post.

According to an aspect of the invention there is provided a lamp post comprising a support pole and a plurality of pole modules arranged one above the other along a vertical axis of the support pole, and supported by the support pole. The plurality of pole modules comprises a light pole module and a functional pole module. The light pole module comprises a light source. The functional pole module comprises a tubular portion configured for being aligned with the vertical axis of the support pole, a bracket protruding outwardly of said tubular portion, and a functional unit fixed to said bracket. Preferably, the functional unit is a camera unit. Preferably, the bracket is provided with a removable connection interface configured for removably connecting the functional unit to the bracket.

In that manner the functional unit can be arranged in a convenient manner at a distance of the vertical axis of the support pole. By having the tubular portion, the functional pole module can be easily coupled to the support pole and/or to another pole module below or above the functional pole module, resulting in a very stable mounting of the functional unit at a distance of the tubular portion. Especially for a camera unit it is advantageous to limit any movement of the camera unit, which is achieved through the use of a functional pole module as defined above.

In an exemplary embodiment the functional unit comprises a connection plate, and the removable connection interface comprises a connection plate fixed to the connection plate of the functional unit. Such a connection plate may be e.g. a horizontally orientated plate or a vertically oriented plate. In case of a horizontally oriented plate, the functional unit may be fixed to a lower or to an upper side of the plate.

In an exemplary embodiment the functional unit comprises an outer or inner screw thread; and the removable connection interface comprises an inner or outer screw thread matching with the screw thread of the functional unit.

According to embodiments of the invention the removable connection interface may be changed depending on the type of functional unit that needs to be mounted, whilst the tubular portion and bracket may remain the same.

In a preferred embodiment, the bracket is a hollow bracket, and at least one connection line extends from the functional unit through the bracket and the tubular portion, to an interior space of the support pole or in another pole module. In that manner the functional unit can be connected in a convenient way to power supply means and/or to a control unit, and more generally to any means in the support pole or in any one of the other pole modules. The connection line may comprise an electrical and/or electronic and/or optical connector at said removable connection interface. In that manner the functional unit can be conveniently connected when fitted to the removable connection interface.

According to a preferred embodiment the bracket and the tubular portion are formed as one integral part. In that manner improved sealing properties can be obtained.

According to an exemplary embodiment an intercom interface is provided in or to the support pole; wherein said intercom interface is preferably configured to communicate through IP and/or SIP (Session Initiation Protocol); wherein said intercom interface comprises an audio and/or video intercommunication module.

Also, the lamp post may further comprise a control and communication unit configured for obtaining raw data from the functional unit and for outputting said raw data or processed data derived from said raw data, preferably to a remote management subsystem, e.g. a server. In that manner the output data can be further processed and/or analyzed by the remote management system, and optionally appropriate feedback, e.g. an alarm message, may be communicated back to lamp post. In other exemplary embodiments, the obtained raw data or processed data derived from said raw data may be used locally in the lamp post. For example, the obtained raw data or processed data derived from said raw data, may be directly sent to an output means, such as a light device, e.g. a light ring, or to a loudspeaker, in order for a suitable output signal to be output, e.g. a lighting of the lighting device according to a predefined configuration, or an audio or sound message. In addition or alternatively, the output means may be receiving a message from a local controller in or near the lamp post, or from the remote management subsystem, wherein the message is based at least partially on the obtained raw data or processed data derived from said raw data. It is noted that the functional unit may be provided with internal storage and/or processing and/or communication means, but in other embodiments storage and/or processing and/or communication means may be provided at a distance of the functional unit, e.g. in the bracket or in the tubular portion of the functional pole module, and/or in another location in the lamp post, and/or outside of the lamp post.

According to an exemplary embodiment, the bracket has a length l in a length direction protruding outwardly of the tubular portion, and a width w extending in a direction perpendicular to an axial direction A of the tubular portion and perpendicular to the length direction, said width w being preferably inferior to an external diameter D of the tubular portion. The length l may be between 15 cm and 100 cm, preferably between 20 cm and 70 cm. The width w may be e.g. between 5 and 25 cm. In a possible embodiment the width w may gradually decrease in a radial direction of the tubular portion. Preferably, the bracket has a height h which may be between 2 and 20 cm, more preferably between 4 and 12 cm, even more preferably between 4 and 10 cm. The height h may vary seen in a radial direction of the tubular portion.

In a preferred embodiment, the bracket comprises a compartment configured for housing components, typically electronic components. Preferably, the compartment is connected with the tubular portion via a first passage and with the functional unit via a second passage. Preferably, the first and/or second passage has a cylindrical inner wall portion. In that manner any components needed for operating the functional unit and/or for communicating with the functional unit may be included in the compartment.

The bracket may further comprise a door or removable cover providing access to the compartment. Alternatively or additionally, the tubular portion may be provided with a removable cover or a door providing access to the compartment. Preferably, a seal is arranged between the removable cover or door and a circumferential edge of the compartment. This improves the sealing class of the lamp post.

In an exemplary embodiment, the bracket may be provided with multiple compartments, e.g. a top and a bottom compartment, and/or two or more adjacent compartments. In such an embodiment there may be provided multiple removable covers or doors, e.g. a top cover or door and a bottom cover or door, and/or two or more adjacent covers or doors.

In a preferred embodiment, a cable gasket is arranged in a passage between the tubular portion and the compartment, wherein a cable passes from the tubular portion through the cable gasket to the compartment. In addition, or alternatively, a cable gasket may be arranged in a passage between the compartment and the functional unit, wherein a cable passes from the compartment through the cable gasket to the functional unit. In that manner the compartment is suitably sealed, whilst allowing one or more connection lines to be entered from the tubular portion of the lamp post into the compartment and/or from the compartment to the functional unit.

In a preferred embodiment, the removable connection interface comprises the passage between the compartment and the functional unit. In an exemplary embodiment, the removable connection interface comprises a first tubular portion configured for receiving a cable gasket and a second tubular portion provided with a screw-thread.

In a possible embodiment, the above mentioned cable gasket may comprise a substantially cylindrical sealing body with one or more through-holes for one or more cables, and with one or more cuts extending between the cylindrical outer surface of the substantially cylindrical sealing body and each through-hole, said one or more cuts allowing for a cable to be brought in each through-hole. It is noted that the above mentioned cable gasket may comprise multiple parts for realizing the sealing. For example the substantially cylindrical sealing body may be combined with further sealing bodies to seal the passage to be sealed, e.g. the passage between the compartment and the functional unit or the passage between the compartment and the tubular portion.

In preferred embodiments the functional unit is a camera, e.g. a 360° camera or a pan-tilt-zoom (PTZ) camera. However, in other embodiments the functional unit may be e.g. a display, an antenna, an environmental sensor such as a microphone, or a detector of $CO_2$, $NO_x$, smoke, etc., a human interface device (HID), e.g. a loudspeaker, a button. Other examples of a functional unit are a repeater, e.g. a WiFi repeater, a radar sensor, a sign, a publicity banner, a shower head, a sprinkler, a water sprayer, etc. In order to be able to suitably connect any one of those functional units, a plurality of different removable connection interfaces may be provided, e.g. connection interfaces having a different dimension and/or having a different screw-thread and/or having a different coupling mechanism. Depending on the functional unit that needs to be provided, a suitable connection interface can then be selected.

In an exemplary embodiment, the functional pole module is provided with a single bracket. However, in other exemplary embodiments, the functional pole module may be provided with multiple brackets. For example, the functional pole module may comprise a first bracket with a first functional unit attached to the first bracket, and a second bracket with a second functional unit attached to the second bracket, wherein the first and the second functional unit may be the same or different, and may be any one of the functional units listed above. Those multiple brackets may have any one or more of the features described above for the bracket. The multiple brackets may be connected to the tubular portion at different locations, e.g. a first bracket opposite a second bracket, a first bracket above a second bracket, three or more brackets distributed across the circumference of the tubular portion, etc. By having multiple brackets, the field of operation of the functional units can be increased (e.g. if two brackets with each a camera are provided, the field of view of the cameras is increased), and/or different functional modules can be added In an exemplary embodiment, the lamp post comprises multiple functional modules provided with one or more brackets. For example, the lamp post may comprises a first functional module with a bracket and a first functional unit attached to the bracket, and a second functional module with a bracket and a second functional unit attached to the bracket, wherein the first and the second functional unit may be the same or different, and may be any one of the functional units listed above.

In an exemplary embodiment, the removable connection interface is a holder of the functional unit, wherein the bracket is provided with a seat for receiving the holder, and wherein the holder is configured for being positioned in different positions in the seat, preferably in a sealed manner. A possible seat and holder have been described in detail in Belgian patent application with application number BE 2018/5412 in the name of the applicant, which is included herein by reference. In BE 2018/5412 the seat is provided generally in a casing, but the skilled person understands that the same seat may be provided in a bracket of any one of the embodiments described above.

Other preferred embodiments are disclosed in the dependent claims and the technical advantages of those embodiments are described in the figure description below.

The invention further relates to a video surveillance system comprising a plurality of lamp posts as described above, and a remote management subsystem configured to receive raw or processed data from the plurality of lamp posts and/or to send audio and/or video and/or alarm data to said plurality of lamp posts.

Also the invention relates to a functional pole module for use in a lamp post as described above. The functional pole module may have any one of the features described above.

According to an exemplary embodiment the plurality of pole modules further comprises an antenna pole module, and the lamp post is further provided with a base station module. The antenna comprises an antenna configured for receiving and emitting cellular data. The base station module comprises a housing and base station circuitry mounted in said housing. The base station circuitry is coupled to the antenna. The base station module may be attached to an external surface of the support pole and may be carried and supported by the support pole. By attaching the base station module to an external surface of the support pole such that the base station module is carried by the support pole, it is not necessary to provide an additional foundation for the base station module contrary to prior art solutions which require an additional cabinet adjacent the support pole.

It is noted that the term "supported" as in "the pole module is supported by the support pole" does not imply that the pole module needs to be directly fixed on the support pole; indeed, there may be intermediate pole modules or elements between the support pole and the pole module; the support pole supports the plurality of pole modules which are arranged one above the other.

According to an exemplary embodiment, the support pole is fixed in the ground and the housing of the base station module is at a distance above the ground. It is noted that the housing may also be in contact with the ground as long as it is carried by the support pole.

According to an exemplary embodiment, the light source comprises a plurality of light emitting diodes, e.g. an array of light emitting diodes, which may be arranged on a PCB. Further, a driver for driving the plurality of light emitting diodes, optionally in combination with a dimmer may be integrated in the lamp post in any known manner.

According to an exemplary embodiment the support pole is hollow, and the support pole is provided with a removable door providing access to an inner part of said support pole.

In an exemplary embodiment the lamp post comprises an antenna connection cable from the antenna pole module through an inner part of the support pole; and a power connection cable passing from a lower end of the support pole to the respective pole modules required to be powered.

According to an exemplary embodiment the antenna pole module is arranged in a position above the functional pole module with bracket. Generally, it is desirable to arrange the antenna pole module in a relatively high position. However, usually it is preferred to position the antenna pole module at a lower position than the light pole module. The antenna pole module may be arranged between the functional pole module with bracket and the light pole module, seen in an axial direction of the support pole. In an alternative embodiment the antenna pole module could be arranged below functional pole module with bracket or above the light pole module, e.g. as the highest pole module of the lamp post.

According to an exemplary embodiment the plurality of pole modules are pole modules as disclosed in EP 3 076 073 B1 which is included herein by reference. By using pole module connectors as disclosed in EP 3 076 073 B1 with two connector portions which can be clamped around round end parts of the pole modules, a pole module can be rotated around the axial direction of the support pole in the desired position and then fixed by the connector portions.

Examples of functional circuitry which may be included in a functional pole module or in a housing attached to an external surface of the support pole (in addition to or instead of the base station circuitry), are any one or more of the following:

power management circuitry comprising e.g. one or more of: a power meter, a fuse, a line protection, a circuit breaker, an electrical connection for multiple power lines, a clock, an astroclock, a power supply module, an PLC, a computer, a communication module, display circuitry, etc.; preferably the power management circuitry is configured to manage the provision of power to multiple lamp posts, preferably at least three lamp post, e.g. more than ten lamp posts. In such embodiments power connection cables pass from the functional module through the support pole to other lamp posts, e.g. underground.

telecommunication circuitry which can comprise at least one of: an optical fiber connection, a fiber to copper interface, a fiber patch panel, a modem, a router, a switch, a patch panel, a network video recorder (NVR), a computer;

audio system management circuitry which can comprise at least one of: an amplifier, a transformer, a media player (connected to network or not), electrical connections for multiple loudspeaker lines, a computer;

WiFi circuitry, wherein an antenna for receiving WiFi signals may be integrated either in the functional module or in a separate antenna module as in the exemplary embodiment of the lamp post with a base station module;

charger circuitry, e.g. phone charger circuitry or vehicle charger circuitry;

an environmental sensor such as a microphone, or a detector of $CO_2$, $NO_x$, smoke, etc., and the associated circuitry;

a human interface device (HID) and the associated circuitry, e.g. a camera, a loudspeaker, a button, etc.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIGS. 9A and 9B illustrate schematic perspective views of an exemplary embodiment of a functional pole module with a bracket which is fixed using a pole module connector;

DESCRIPTION OF EMBODIMENTS

Figure 1:
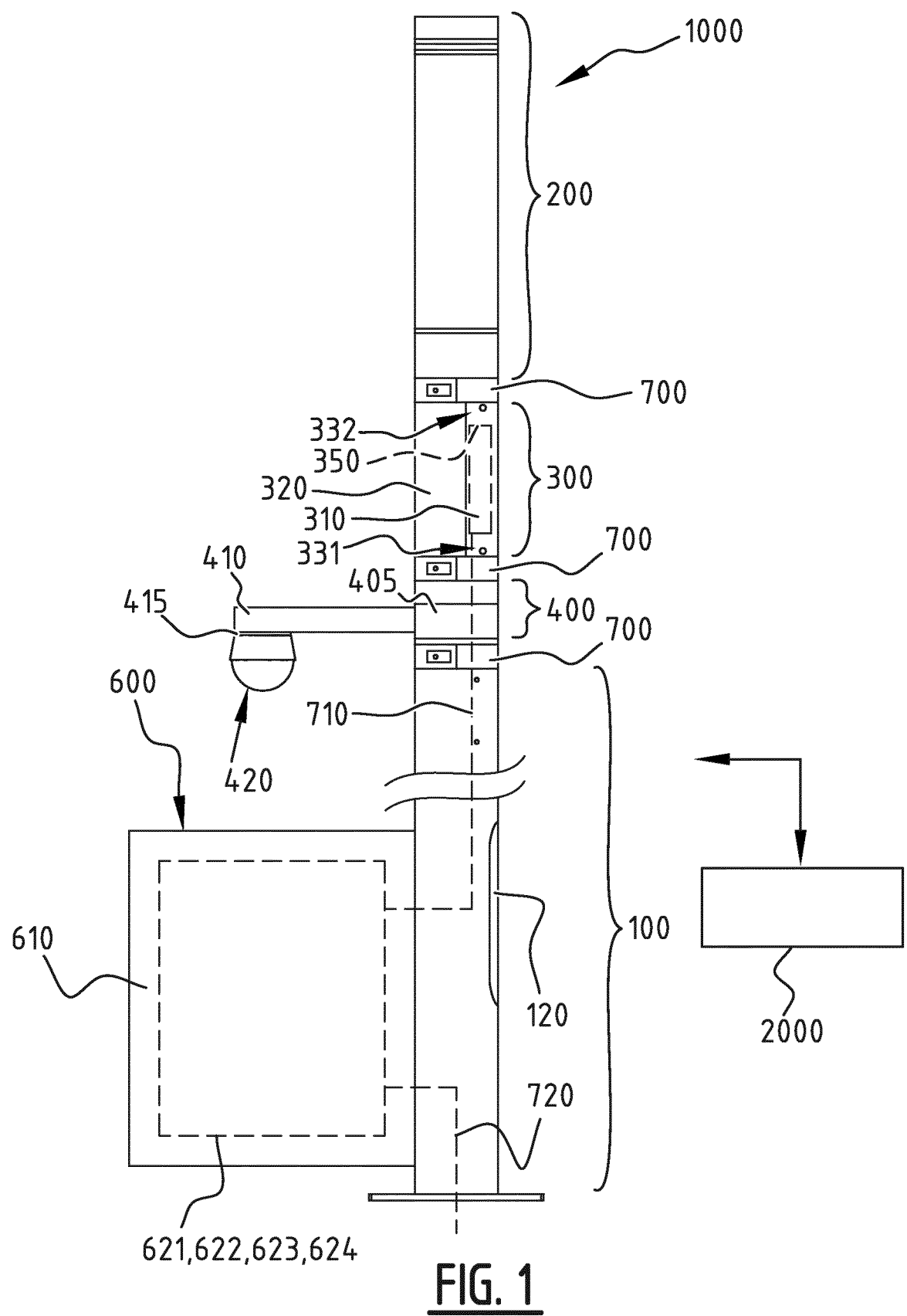
FIG. 1 illustrates schematically an exemplary embodiment of a lamp post of the invention.

FIG. 1 illustrates schematically an exemplary embodiment of a lamp post 1000. The lamp post 1000 comprises a support pole 100 and a plurality of pole modules 200, 300, 400 supported by the support pole 100. The plurality of pole modules comprises a light pole module 200 comprising a light source, an optional antenna pole module 300 comprising an antenna 350 configured for receiving and emitting cellular data; a functional pole module 400 with a bracket 410, e.g. a camera pole module with a camera unit 420 fixed to the bracket 410. The camera pole module may be e.g. a video surveillance pole module. Other exemplary functionalities which may be included in one or more optional pole modules are any one or more of the following:

power management circuitry comprising e.g. one or more of: a power meter, a fuse, a line protection, a circuit breaker, an electrical connection for multiple power lines, a clock, an astroclock, a power supply module, an PLC, a computer, a communication module, display circuitry, etc.; preferably the power management circuitry is configured to manage the provision of power to multiple lamp posts, preferably at least three lamp post, e.g. more than ten lamp posts. In such embodiments power connection cables pass from the functional pole module through the support pole to other lamp posts, e.g. underground.

a loudspeaker;

telecommunication circuitry which can comprise at least one of: an optical fiber connection, a fiber to copper interface, a fiber patch panel, a modem, a router, a switch, a patch panel, a network video recorder (NVR), a computer;

audio system management circuitry which can comprise at least one of: an amplifier, a transformer, a media player (connected to network or not), electrical connections for multiple loudspeaker lines, a computer;

WiFi circuitry;

charger circuitry, e.g. phone/computer/tablet charger circuitry or vehicle charger circuitry;

an environmental sensor such as a microphone, or a detector of $CO_2$, NOx, smoke, etc., and the associated circuitry;

any human interface device (HID) and the associated circuitry.

The pole modules 200, 300, 400 may be arranged in any order one above the other, and may be connected to the support pole 100 and to each other in any suitable way, e.g. using pole module connectors 700 as described in EP 3 076 073 B1 in the name of the applicant. FIGS. 9A and 9B illustrate in detail how the functional pole module 400 and the support pole 100 may be connected to each other using a pole module connector 700 comprising two connector portions 701, 702 which can be clamped around round end parts 411, 412 of the functional pole modules. A functional pole module 400 can be rotated around the axial direction A of the support pole 100 in a desired position and then fixed by the connector portions 701, 702 and a fixation means 703 for coupling the two connector portions 701, 702 to each other around round end parts 411, 412 of the functional pole module and the support pole 100 to be connected. Also the connection between any two adjacent pole modules 200, 300, 400 arranged one above the other can be done in the way illustrated in FIGS. 9A and 9B.

Figure 8:
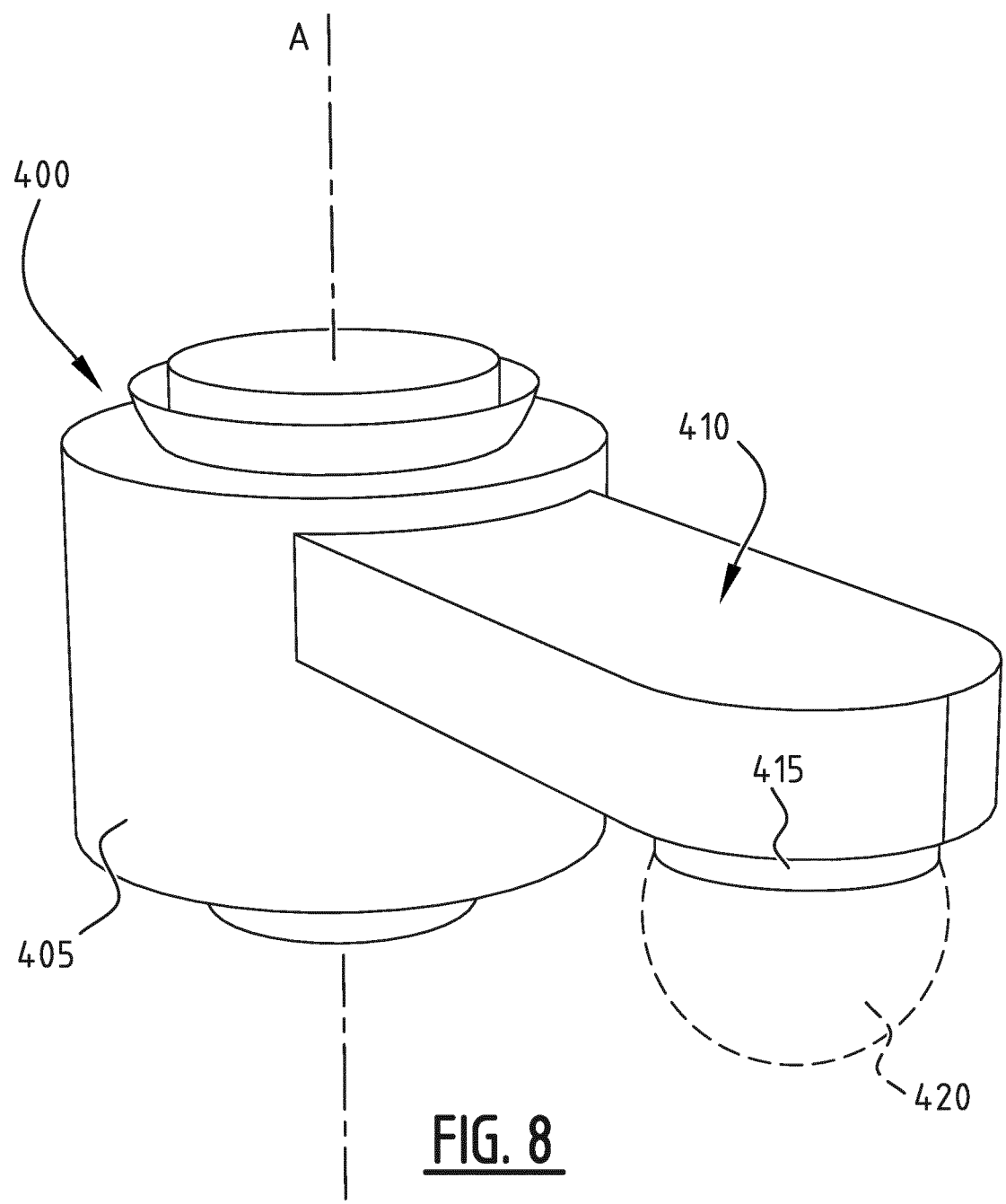
FIG. 8 shows a schematic perspective view of an exemplary embodiment of a functional pole module with a bracket.

The functional pole module 400 is illustrated in detail in FIG. 8 and comprises a tubular portion 405 configured for being aligned with the vertical axis A of the support pole 100, a bracket 410 protruding outwardly of said tubular portion 405, and a functional unit 420 fixed to said bracket 410. To that end the bracket is provided with a removable connection interface 415 configured for removably connecting the functional unit 420 to the bracket 410. By using a removable connection interface the connection interface can be designed to match with the functional unit 420. In that manner there may be provided a multi-use functional pole module 400 with a bracket 410 for which the connection interface 415 and the functional unit 420 can be changed depending on the desired use. In a preferred embodiment the functional unit is a camera unit, but the functional unit may be any unit that is suitable for being placed at a distance of the vertical axis of the lamp post, e.g. an additional lighting unit, a microphone unit, etc. The camera unit may be a 360° camera unit, e.g. a 360° IP camera or a pan-tilt-zoom (PTZ) camera.

Figure 11A:
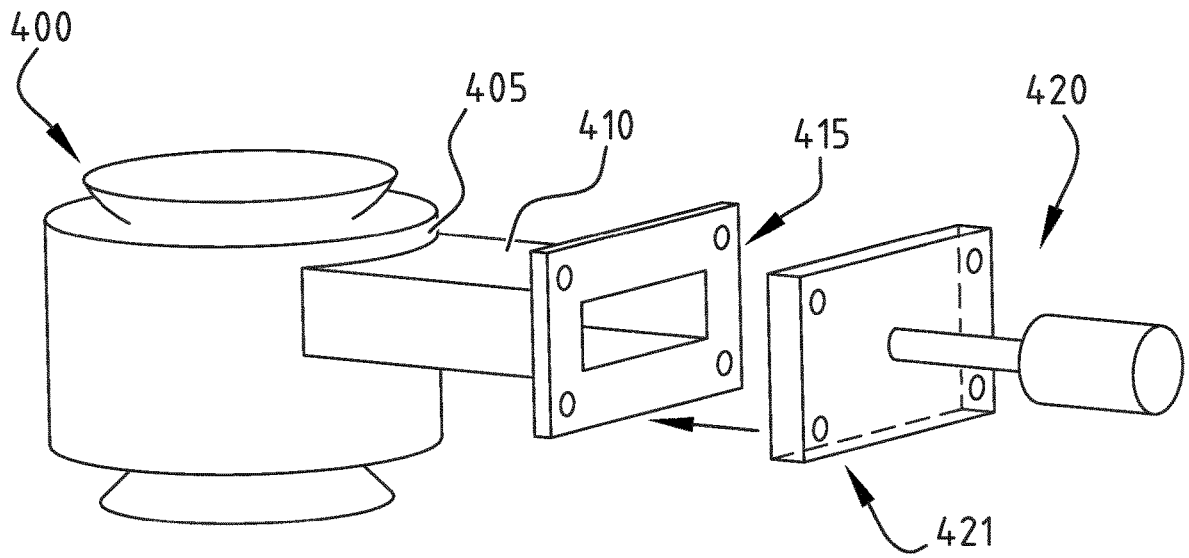
FIGS. 11A and 11B illustrate schematically two variants of the embodiment of FIG. 8.

In another exemplary embodiment illustrated in FIG. 11A, the functional unit 420 comprises a connection plate 421, and the removable connection interface 415 is a connection plate configured to be fixed to the connection plate 421 of the functional unit 420, e.g. using a plurality of bolds or screws (now shown). The functional unit 420 may be a camera unit, e.g. a so-called bullet camera which is a type of video camera which is often used in surveillance systems.

Figure 11B:
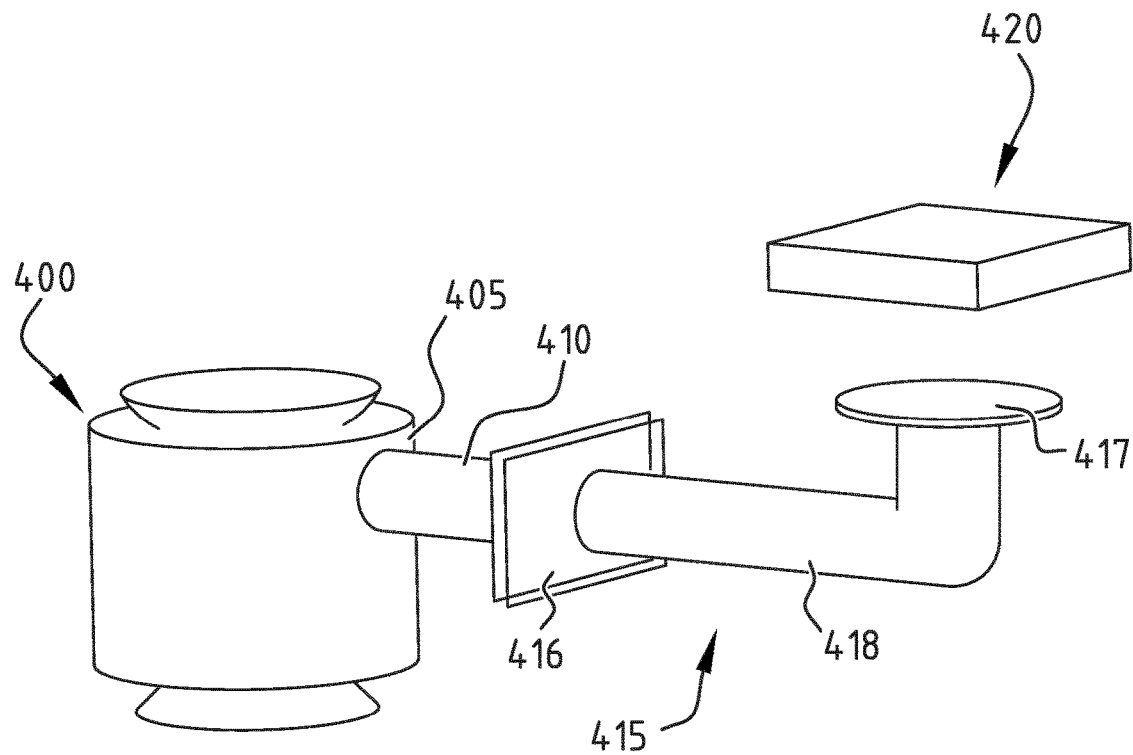

FIG. 11B illustrates yet another exemplary embodiment where the functional unit 420 is configured to be arranged on a horizontal plate. In this embodiment the removable connection interface 415 may comprises: a first connection means 416, e.g. plate and a plurality of bolds or screws, for connecting the removable connection interface 415 to the bracket 410; a horizontal platform 417 on which the functional unit 420 may be arranged; and a connector 418, e.g. a connecting tube, for connecting the platform 417 to the first connection means 416. Preferably, connection cable passes through the removable connection interface 415. To that end the platform 417 may be provided with a hole, and the connector 418 may be hollow. The functional unit 420 may be a camera unit, e.g. a so-called Automatic Number Plate Recognition (ANPR) camera configured for the automatic recognition of number plates.

In another exemplary embodiment (not illustrated) the functional unit 420 comprises an outer or inner screw thread; and the removable connection interface 415 comprises an inner or outer screw thread matching with the screw thread of the functional unit 420.

As illustrated in FIGS. 9A and 9B, the functional pole module 400 can be connected to one of the plurality of pole modules 200, 300 and to the support pole 100 through a pole connector 700 comprising a first round connector portion 701 and a second round connector portion 702 which together surround a round end portion 412 of the functional pole module 400 and an adjacent round end portion 411 of said one pole module or the support pole 100. Preferably, the pole connector 700 has an outer diameter which is substantially the same as an outer diameter of the support pole 100. Further, the support pole 100 and the tubular portion 405 of the functional pole module 400 have an outer diameter which is substantially the same. In that manner a lamp post 100 with a more or less cylindrical surface is obtained with the bracket 410 protruding out of the cylindrical surface.

As illustrated in FIG. 9A, preferably the bracket 410 is a hollow bracket, and at least one connection line 450 extends from the functional unit 420 through the bracket 410 and the tubular portion 405, to an interior space of the support pole 100. The connection line 450 may comprise an electrical and/or electronic and/or optical connector 455 at said removable connection interface 415. Preferably the bracket has a length l in a length direction protruding outwardly of the tubular portion, and a width w extending in a direction perpendicular to an axial direction A of the tubular portion and perpendicular to the length direction, said width w being inferior to an external diameter D of the tubular portion. The length may be between 15 cm and 100 cm, preferably between 20 cm to 70 cm. The width w may be e.g. between 5 and 25 cm. In a possible embodiment the width w may gradually decrease in a radial direction of the tubular portion. Preferably the bracket has a height h (see FIG. 12C) that may be between 2 and 20 cm, more preferably between 4 and 12 cm. The height h may vary seen in a radial direction of the tubular portion. Preferably, the height H of the functional module may be between 10 and 100 cm, more preferably between 15 and 50 cm, e.g. between 18 and 35 cm.

Preferably, the functional pole module 400 is rotatable around an axis A of the support pole 100, such that said functional pole module 400 is orientable for orienting the directionality of the bracket 410.

Preferably, the bracket 410 and the tubular portion 405 are formed as one integral part.

FIGS. 12A-12E illustrate another exemplary embodiment of a functional pole module 400, wherein the same reference numerals refer to the same or similar parts. The bracket 410 of the functional pole module 400 is directed outwardly and may be directed slightly upwardly such that an angle between the bracket 410 and a horizontal is between 1° and 10°, see FIG. 12C. In other embodiments the angle may be zero. The embodiment is similar to the embodiment of FIGS. 9A and 9B, and the functional pole module 400 can be connected to one of the plurality of pole modules 200, 300 and/or to the support pole 100 through a pole connector as described above. Preferably the bracket 410 is a hollow bracket, and at least one connection line 450 extends from the functional unit (not shown) though the removable connection interface 415, through the bracket 410 and the tubular portion 405, to an interior space of the support pole.

The connection line 450 may comprise an electrical and/or electronic and/or optical connector. Some connection lines may go from the support pole through the tubular portion 405 to an inner compartment 470 of the bracket, where the connection lines may be connected to a component arranged in the compartment 470, as will be further explained below. Preferably the bracket has a length l in a length direction protruding outwardly of the tubular portion, and a width w extending in a direction perpendicular to an axial direction A of the tubular portion and perpendicular to the length direction, said width w being inferior to an external diameter D of the tubular portion. The length may be e.g. between 15 cm and 100 cm, preferably between 20 cm to 70 cm.

The bracket 410 comprises a compartment 470 configured for housing components, typically electronic components. The compartment may be arranged over a surface area which is at least 30% of the average of the width w multiplied by the length l, i.e. 0.3×w(average)×l. The bracket 410 further comprises a removable cover 471 providing access to the compartment 470. The removable cover 471 may be fixed with two or more screws. Preferably, a seal 473 is provided between the removable cover 471 and a circumferential edge 474 of the compartment 470.

Figure 12A:
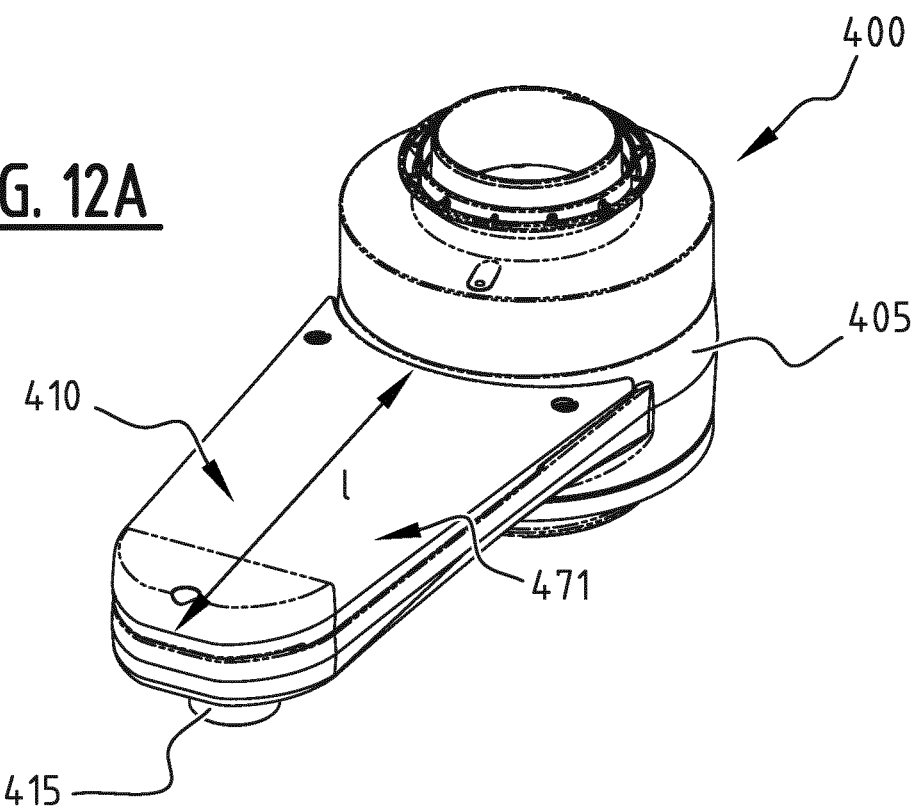
FIGS. 12A and 12B illustrate a schematic perspective view of another exemplary embodiment of a functional pole module with a bracket, as seen from above and from below, respectively.
Figure 12B:
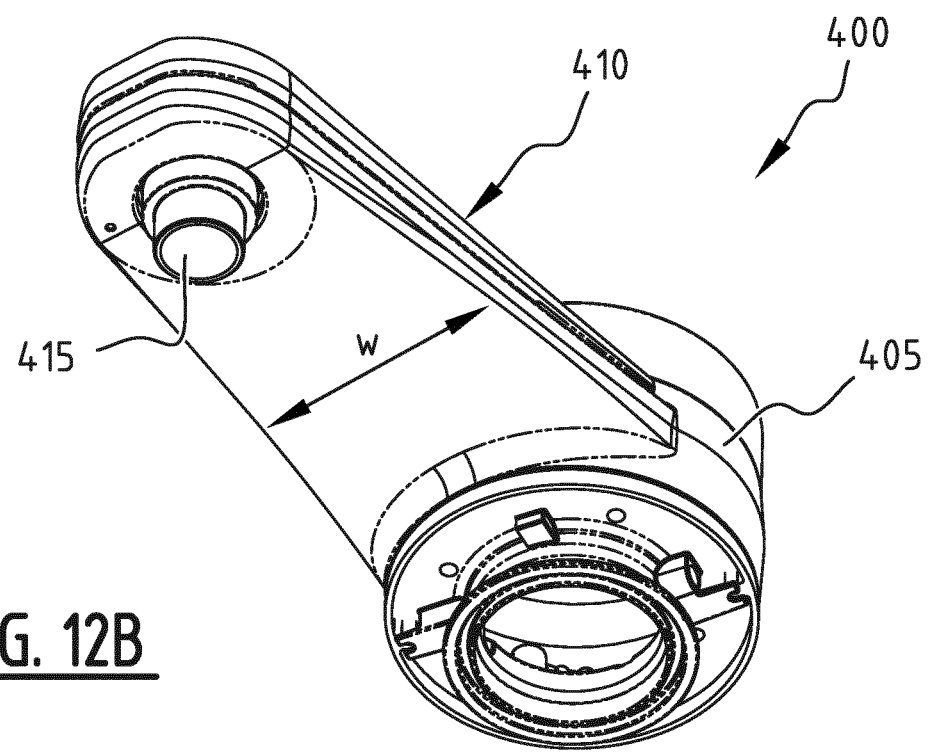
Figure 12C:
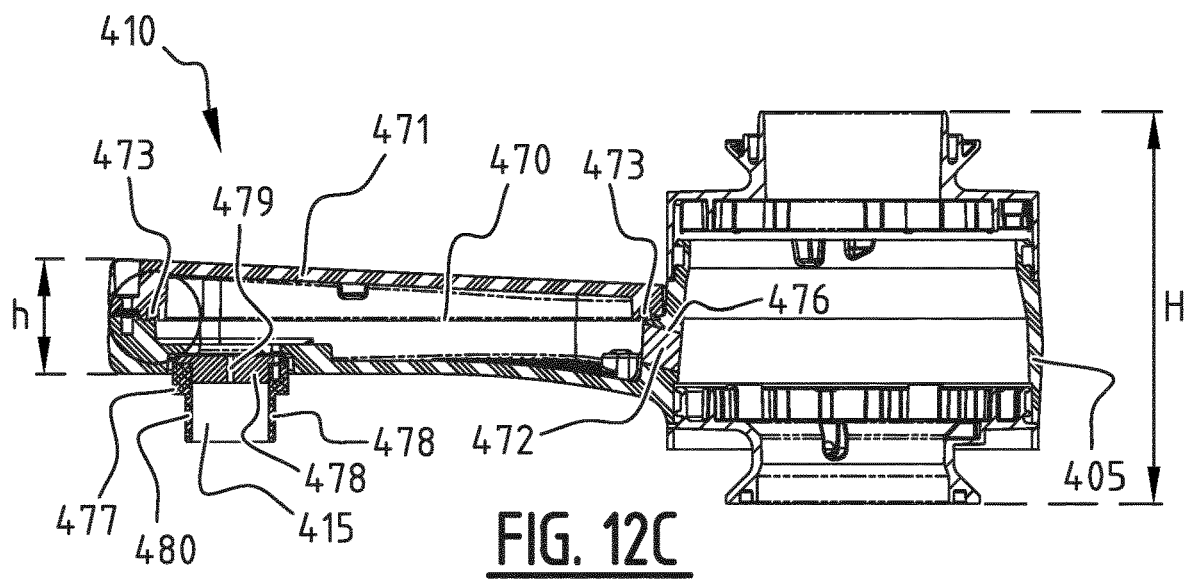
FIG. 12C shows a cross section though a symmetry plane of the bracket of the embodiment of FIG. 12A.
Figure 12D:
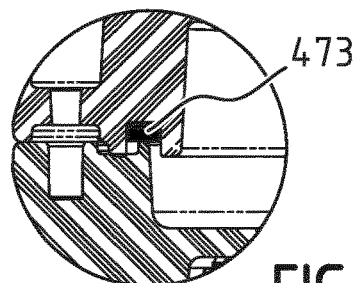
FIG. 12D illustrates a detailed view of X indicated in FIG. 12C.
Figure 12E:
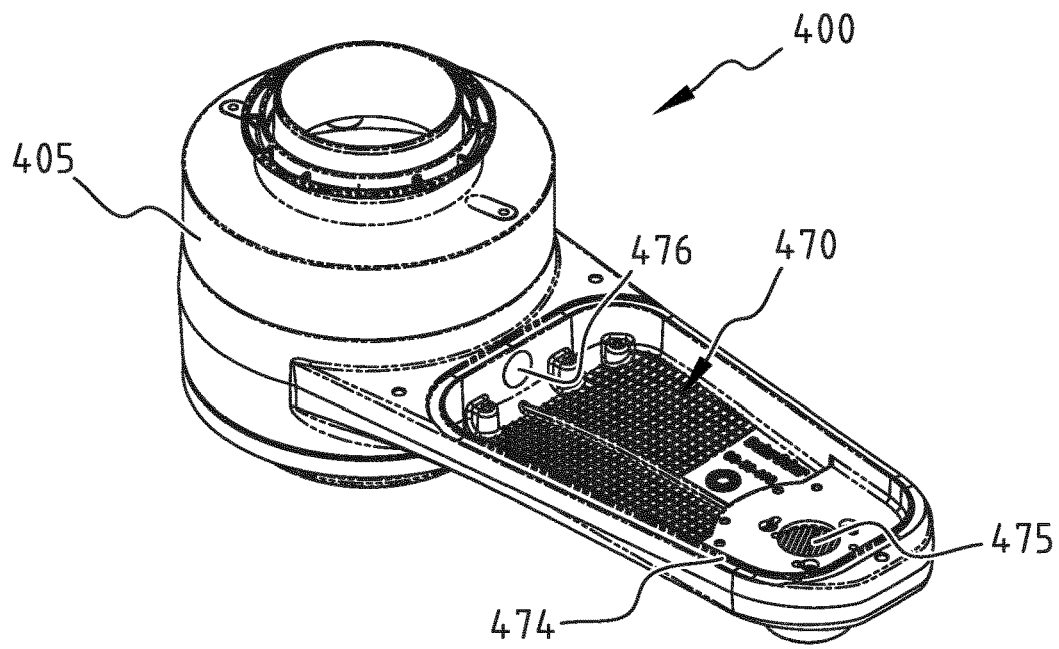
FIG. 12E illustrates a schematic perspective view of the embodiment of FIG. 12A with a removed cover.

Preferably, a first cable gasket 472 is arranged in a first tubular passage 476 between the tubular portion 405 and the compartment 470, wherein one or more cables pass from the tubular portion 405 through the first cable gasket 472 to the compartment 470. Further, a second cable gasket 475 may be arranged in a second tubular passage 477 between the compartment 470 and the functional unit (not shown), wherein one or more cables (not shown) pass from the compartment 470 through the cable gasket 475 to the functional unit. As shown in FIG. 12C, when the removable connection interface 415 comprises a first tubular portion 480 with a screw thread 478, the second tubular passage 477 may be integrated in the removable connection interface 415. The first and the second cable gasket 472, 475 may be formed as a substantially cylindrical sealing body with one or more through-holes 479 for one or more cables, and with one or more cuts extending between the cylindrical outer surface of the substantially cylindrical sealing body and each through-hole, said one or more cuts allowing for a cable to be brought in a through-hole.

In an exemplary embodiment, a power-over-Ethernet cable may extend from the tubular portion 405 into the compartment 470. Such a cable can be useful for many types of functional units, e.g. a camera.

In the illustrated embodiment of FIG. 12C, the removable connection interface 415 comprises a first tubular portion 480 with a screw thread 478 and a second tubular portion 477 for receiving cable gasket 479. The bracket 410 may be provided with a plurality of different removable connection interfaces 415 having e.g. a first tubular portion 480 with a different diameter and/or a different internal and/or external screw-thread. Depending on the type of functional unit 20 that needs to be connected a suitable connection interface 415 can then be chosen.

In an exemplary embodiment an intercom interface (not illustrated) is provided in or to the support pole 100, e.g. in the cylindrical outer wall of the support pole 100. The intercom interface is preferably configured to communicate through IP and/or SIP (Session Initiation Protocol); and may comprise an audio and/or video intercommunication module. In another embodiment the intercom interface may be provided in or to a functional module.

Preferably, the lamp post further comprises a control and communication unit configured for obtaining raw data from the functional unit 420, e.g. a camera unit, and for outputting said raw data or processed data derived from said raw data.

Embodiments of the invention also relate to a video surveillance system comprising a plurality of lamp posts 1000 according to any one of the previous embodiments, and a remote management subsystem 2000 (see FIG. 1) configured to receive the raw or processed data from the plurality of lamp posts 1000 and/or to send audio and/or video and/or alarm data to said plurality of lamp posts 1000, e.g. data to be output by the intercom interface. When the lamp posts are located near a parking, the remote management subsystem 2000 may be configured to extract useful information, such as parking space information from the received data. Other examples are of useful information: face collection, traffic information, etc. Also when certain events are derived from the received data, the remote management subsystem 2000 may send e.g. alarm messages to the lamp post or to another server in reaction to the detection of certain events. When an alarm message is sent to a lamp post 1000, the lamp post 1000 may output an alarm, e.g. an audio alarm, a light alarm (e.g. red light), a video alarm, etc.

Figure 10A:
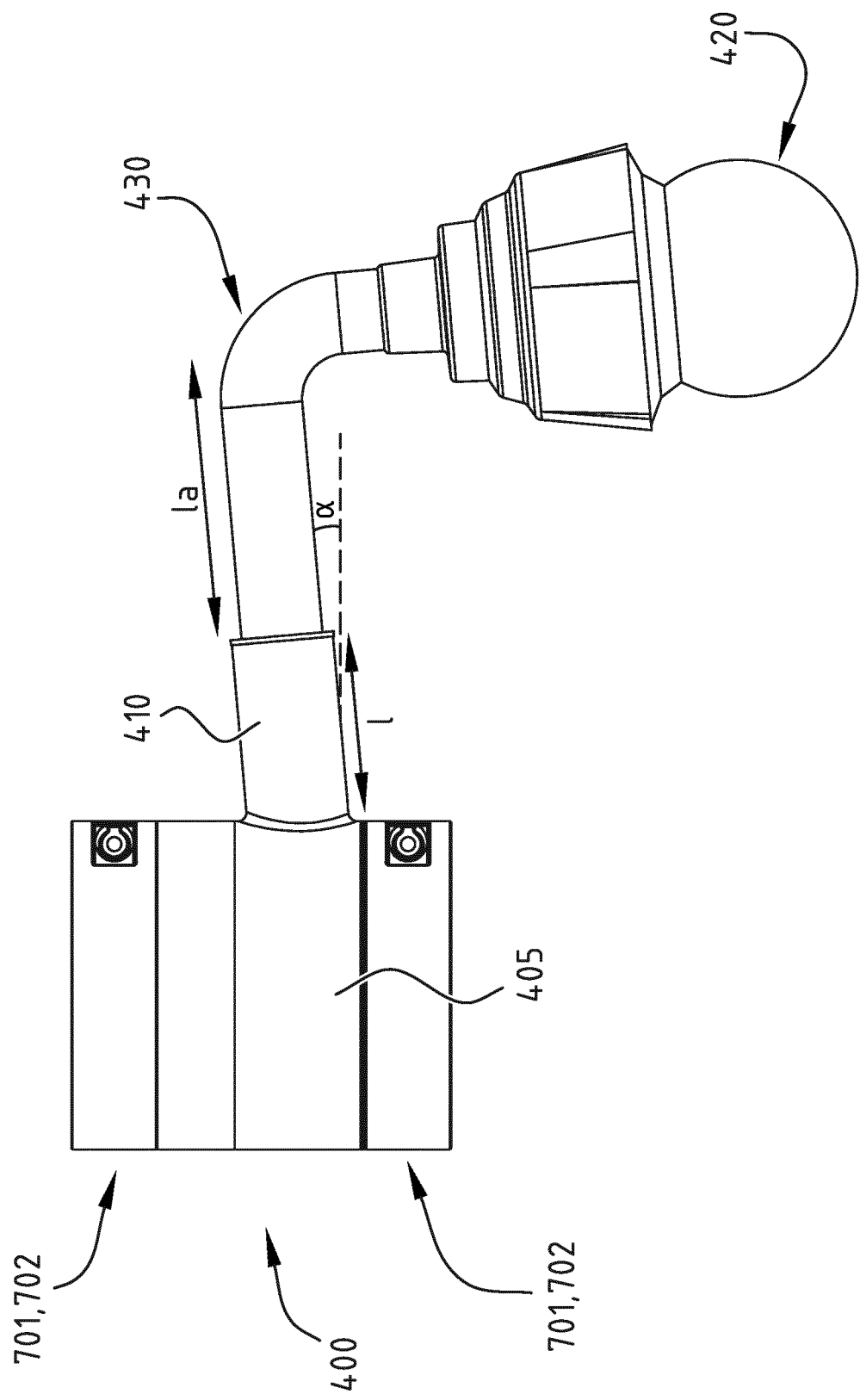
FIGS. 10A, 10B and 10C illustrate a side view, a perspective bottom view, and a perspective top view of an exemplary embodiment of a functional pole module with a bracket.
Figure 10B:
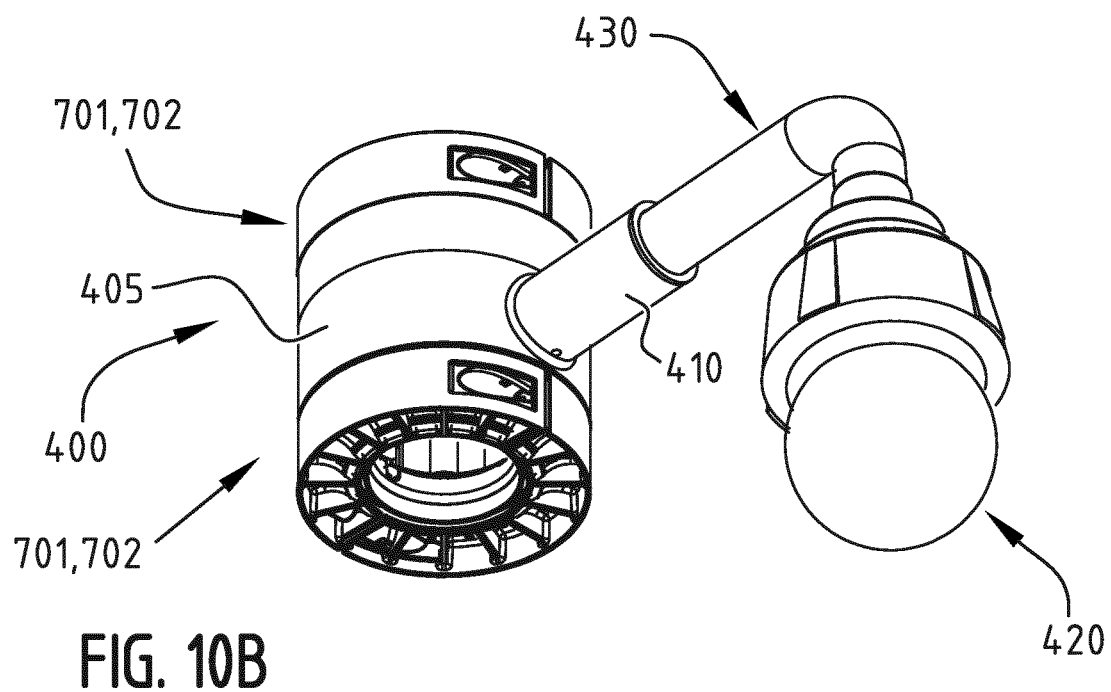
Figure 10C:
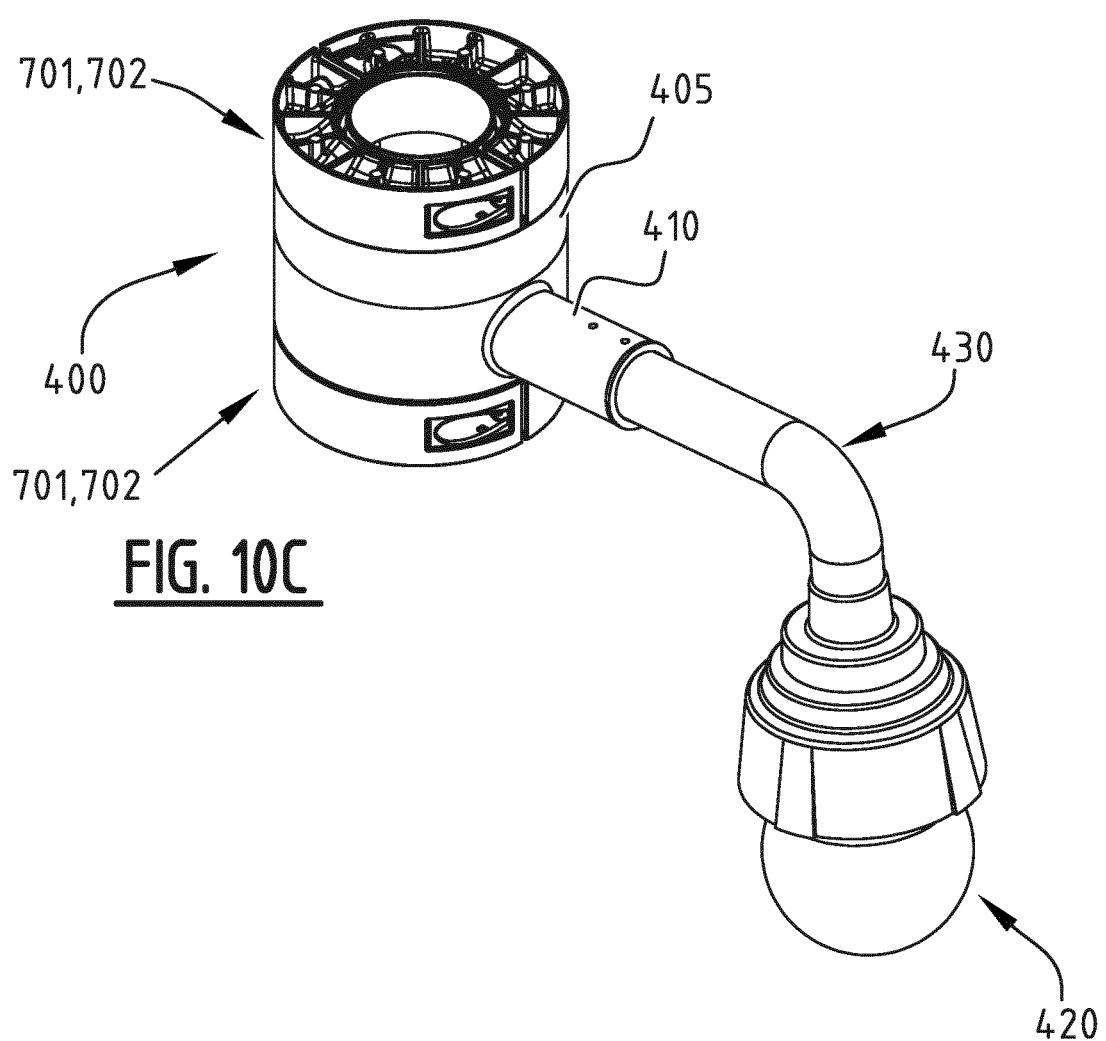

FIGS. 10A-10C illustrate another exemplary embodiment of a functional pole module 400, wherein the same reference numerals refer to the same or similar parts. In this embodiment the bracket 410 of the functional pole module 400 is directed outwardly and may be directed slightly upwardly such that an angle α between the bracket 410 and a horizontal is between 1° and 10°. In other embodiments the angle may be zero. In this exemplary embodiment, the bracket 410 is formed as a tubular bracket section; and a connecting tube 430 is fitted in or around said tubular bracket section 410; wherein the functional unit 420 is fixed to the connecting tube 430. In this embodiment the length l of the bracket 410 can be shorter, and the necessary distance can be created by providing a connecting tube 430 with a suitable length la.

Figure 2A:
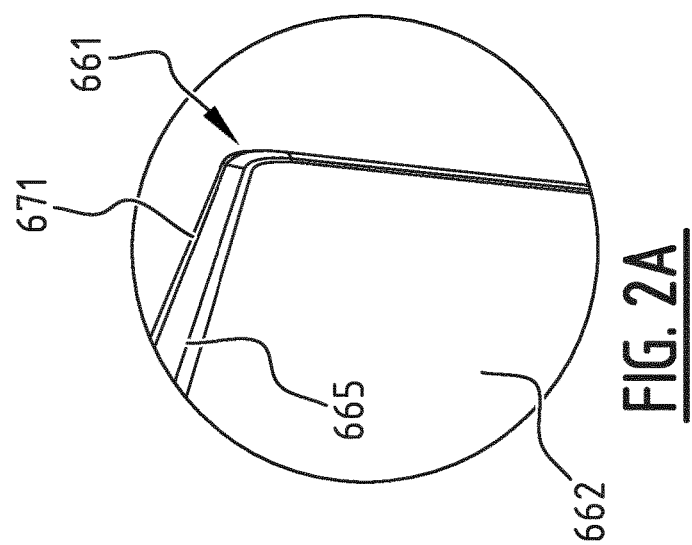
FIG. 2A is a detailed view of a portion of FIG. 2.
Figure 2:
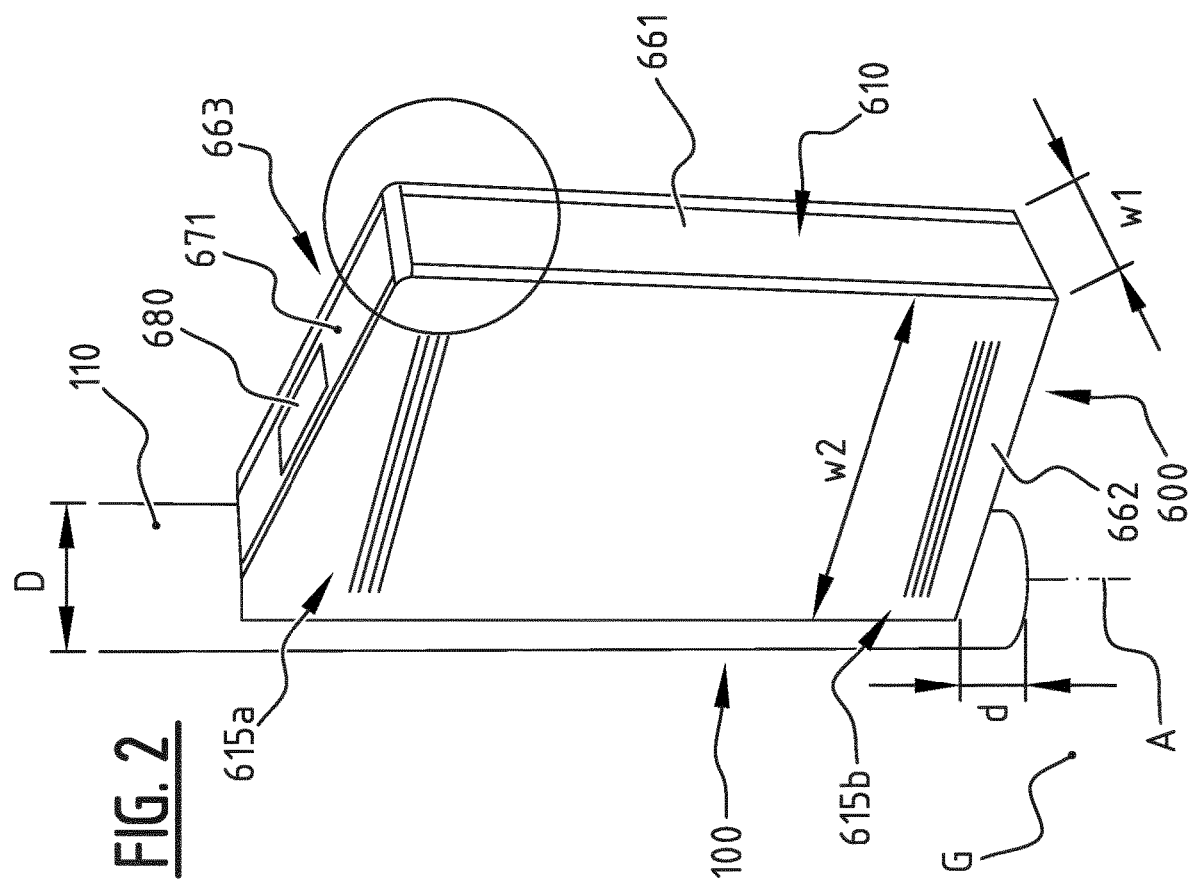
FIG. 2 is a schematic perspective view of an exemplary embodiment of a base station module fixed to a support pole of a lamp post.
Figure 4:
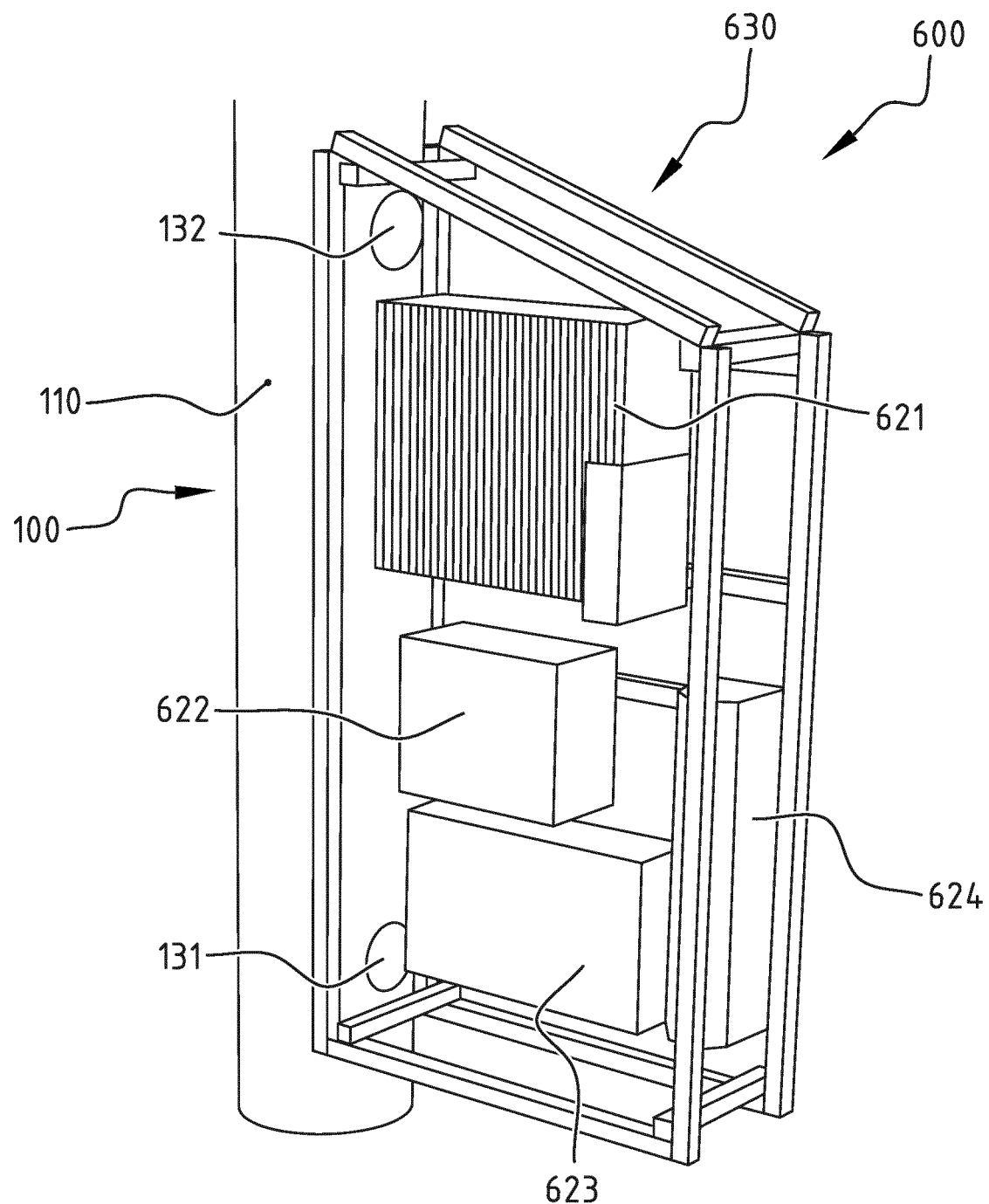
FIG. 4 is a schematic perspective view of an exemplary embodiment of a base station module without the panels of the housing but with the base station circuitry.

The plurality of modules may further comprise a base station module 600 comprising a housing 610 and base station circuitry 621, 622, 623, 624 mounted in said housing 610, see also FIGS. 2 and 4. The base station circuitry 621, 622, 623, 624 is coupled to the antenna 350, see reference 710. The base station module 600 is attached to an external surface 110 of the support pole 100 and the weight thereof is carried by the support pole 100. As illustrated in FIG. 2, the support pole 100 may be fixed in the ground G and the housing of the base station module 600 may be at a distance d above the ground G. However, it is also possible to arrange the base station module more or less flush with the ground G.

The housing 610 of the base station module 600 comprises a structurally rigid ribbed frame 630 attached to the support pole 100; a fixing means 691, 692, e.g. at least two screws or bolts, for fixing the ribbed frame 630 against the external surface 110 of the support pole 100; and one or more panels 661, 662, 663 attached to the ribbed frame, so as to enclose the ribbed frame; see FIGS. 2-5. According to an exemplary embodiment, the housing 610 may be provided with one or more ventilation openings, e.g. a plurality of slits or holes. In the illustrated embodiment a plurality of slits 615a, 615b is arranged in the two opposite side panels 662, 663 of the housing, such that an air flow through the housing is created.

The ribbed frame 630 may comprises at least four upright girders 631, 632, 633, 634; at least four side girders 651, 652, 653, 654 extending in a first width direction perpendicular to an axial direction A of the support pole and connecting the four upright girders 631, 632, 633, 634; and at least four side girders 635, 636, 637, 638 extending in a plane perpendicular to the first width direction and connecting the four upright girders 631, 632, 633, 634. Optionally additional side girders 639, 640, 641 may be provided to facilitate the fixing of the base station circuitry. The ribbed frame 630 is attached to the support pole 100 at a first and second position being at a distance of each other seen in an axial direction of the support pole 100, using e.g. a first and second screw or bolt 691, 692 which passes through girders 642, 643. Optionally additional attachment positions may be provided to facilitate the attaching of the ribbed frame 630 to the support pole 100. In the illustrated embodiment the panels include two side panels 662, 663 and a central angled panel 661 intended to form the top and front side of the housing 610. The central panel 661 may be provided with edges 665 extending over the edges of the side panels 662, 663, as illustrated in FIG. 2A. Optionally a seal (not shown) may be arranged between the edges of adjacent panels. In that manner the risk that water and/or dirt enters in the housing 610 between the edges of the panels, is limited. The skilled person understands that the enclosure of the housing 610 may be formed by other ways, e.g. one integrated enclosure which can be placed around and fixed to the ribbed frame.

The support pole 100 is hollow, and is provided with a removable door 120 providing access to an inner part of said support pole 100, see FIG. 1. The door 120 is arranged substantially opposite to the base station module 600, so that an operator can access the interior of the base station module 600 through the door 120. However, it is also possible to remove one or more panels 661, 662, 663 of the housing 610, in order to access the base station circuitry 621, 622, 623, 624.

Figure 3:
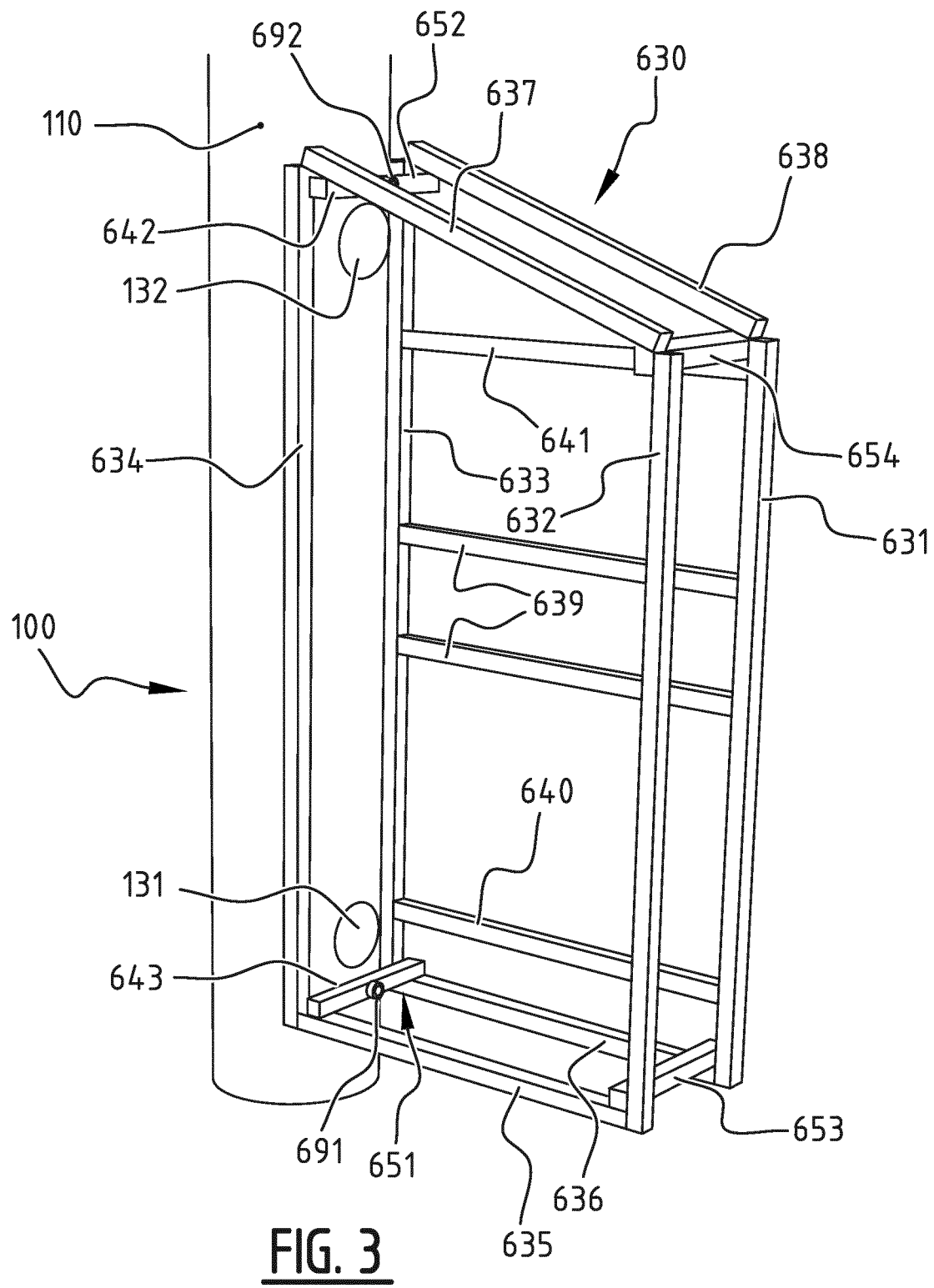
FIG. 3 is a schematic perspective view of an exemplary embodiment of a base station module without the panels of the housing and without the base station circuitry, to visualize the ribbed frame.

The housing 610 of the base station module 600 covers a surface area of the support pole 100; and the support pole 100 is provided in said surface area with a first hole 131 and a second hole 132 positioned above the first hole 131 seen in an axial direction of the support pole 100, see FIGS. 3 and 4. The lamp post 1000 comprises a connection cable 710 (see FIG. 1, not shown in FIGS. 3 and 4) from the antenna 350 through an inner part of the support pole 100, through the second hole 132 to the base station circuitry 621, 622, 623, 624; and a power connection cable 720 passing from a lower end of the support pole 100 through the first hole 131 to feed the base station circuitry 621, 622, 623, 624.

The housing 610 of the base station module 600 has a first width w1 extending in a first direction perpendicular to an axial direction A of the support pole 100, said first width w1 being inferior to an external diameter D of the support pole 100. The housing of the base station module 600 has a second width w2 extending in a second direction perpendicular to the first width and to the axial direction A of the support pole 100, said second width w2 being superior to an external diameter of the support pole 100, preferably at least twice the external diameter of the support pole 100. In that manner a relatively long and narrow compact casing 600 is obtained with a suitable shape for holding base station circuitry.

Figure 6:
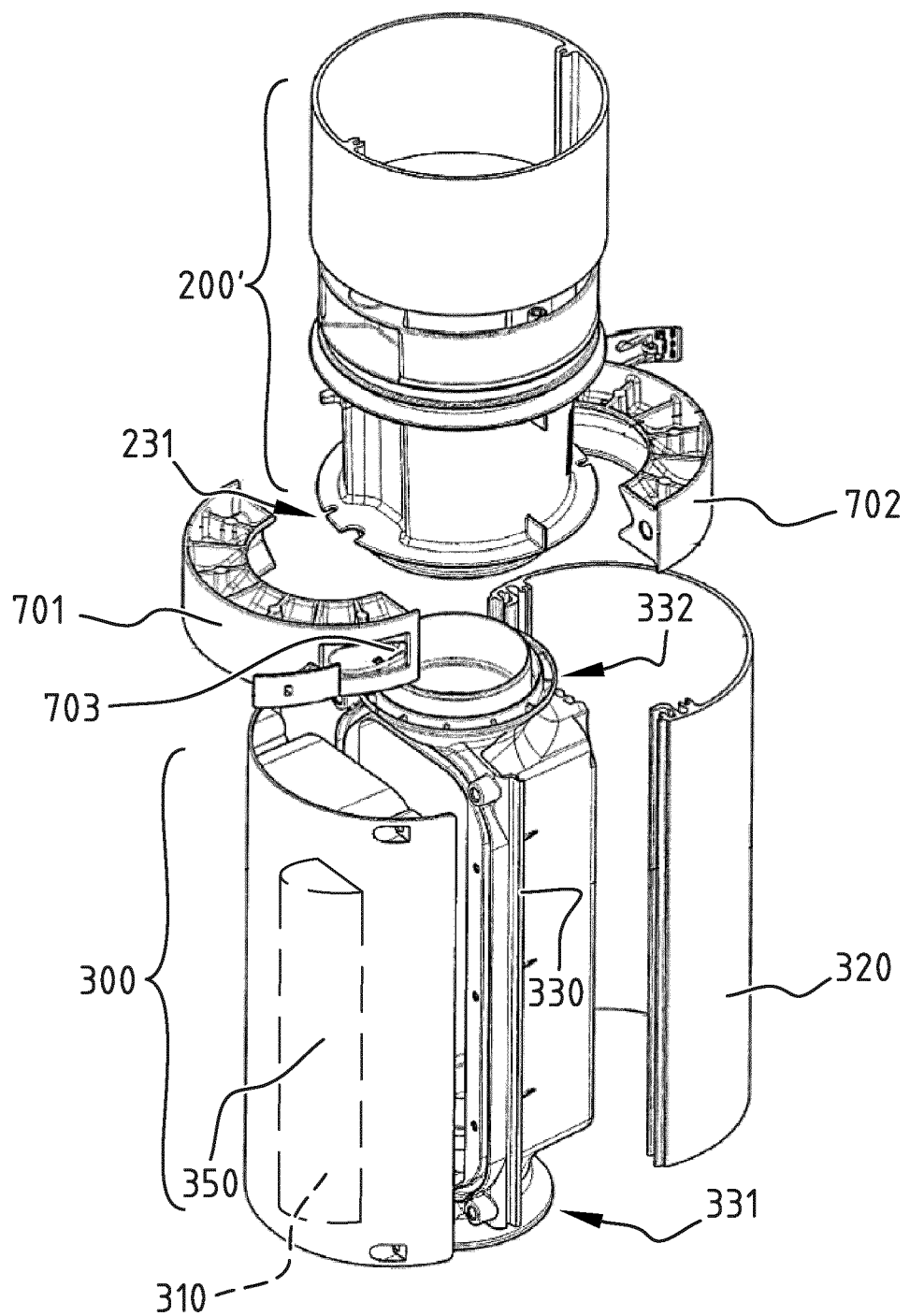
FIG. 6 is a schematic perspective view of an exemplary embodiment of an antenna pole module.

The antenna pole module 300 is arranged in a position above the base station module 600. The antenna pole module 300 is arranged between the base station module 600 and the light pole module 200, seen in an axial direction of the support pole 100. In an alternative embodiment the antenna pole module 300 could be arranged above the light pole module 200. The antenna 350 may be a directional antenna with a limited angular range, e.g. a range covering between 90° and 180°. The antenna pole module 300 has a housing 310, 320 which is arranged in line with the support pole 100. Preferably, the antenna pole module 300 is rotatable around an axis A of the support pole 100, such that said antenna pole module 300 is orientable for orienting the directionality of the receiving and emitting of the antenna 350. For example, the antenna may be included in a pole module as disclosed in EP 3 076 073 B1 which is included herein by reference. Such an example is illustrated in FIG. 6. By using pole module connectors 700 (see FIGS. 1 and 6, wherein only connector 700 is shown in FIG. 6) each having two connector portions 701, 702 which can be arranged around round end parts 331, 332 of the pole modules, the pole module 300 can be rotated around the axial direction A of the support pole 100 in a desired position and then fixed by the connector portions 701, 702 and the fixation means 703 for coupling the two connector portions 701, 702 to each other. The antenna pole module 300 may comprise a central portion 330 including a passage for cables and wires and two cover portions 310, 320. The antenna 350 may be arranged against a face of the central portion 330 and covered by a first cover 310 in a non-metallic material e.g. a plastic material. The central portion 330 and the second cover 320 may be made of a metallic material to enhance the rigidity of the antenna pole module 300. Pole module 200' shown in FIG. 6 may be a light pole module or another additional pole module, e.g. a Wi-Fi transceiver pole module, a loudspeaker pole module, a camera pole module (e.g. a camera pole module with a bracket as illustrated in FIG. 1) e.g. for video surveillance, etc.

As shown in FIG. 4 the base station circuitry comprises a combiner 622, a base transceiver unit 621; a wired or wireless transmission interface 623 configured for being connected to a communication network; and a power management unit 624. The combiner 622 is connected to the antenna 350 and to the base transceiver unit 621; and the base transceiver unit 621 is further connected to the transmission interface 623. The transmission interface 623 may be e.g. a fibre to copper interface.

Figure 5:
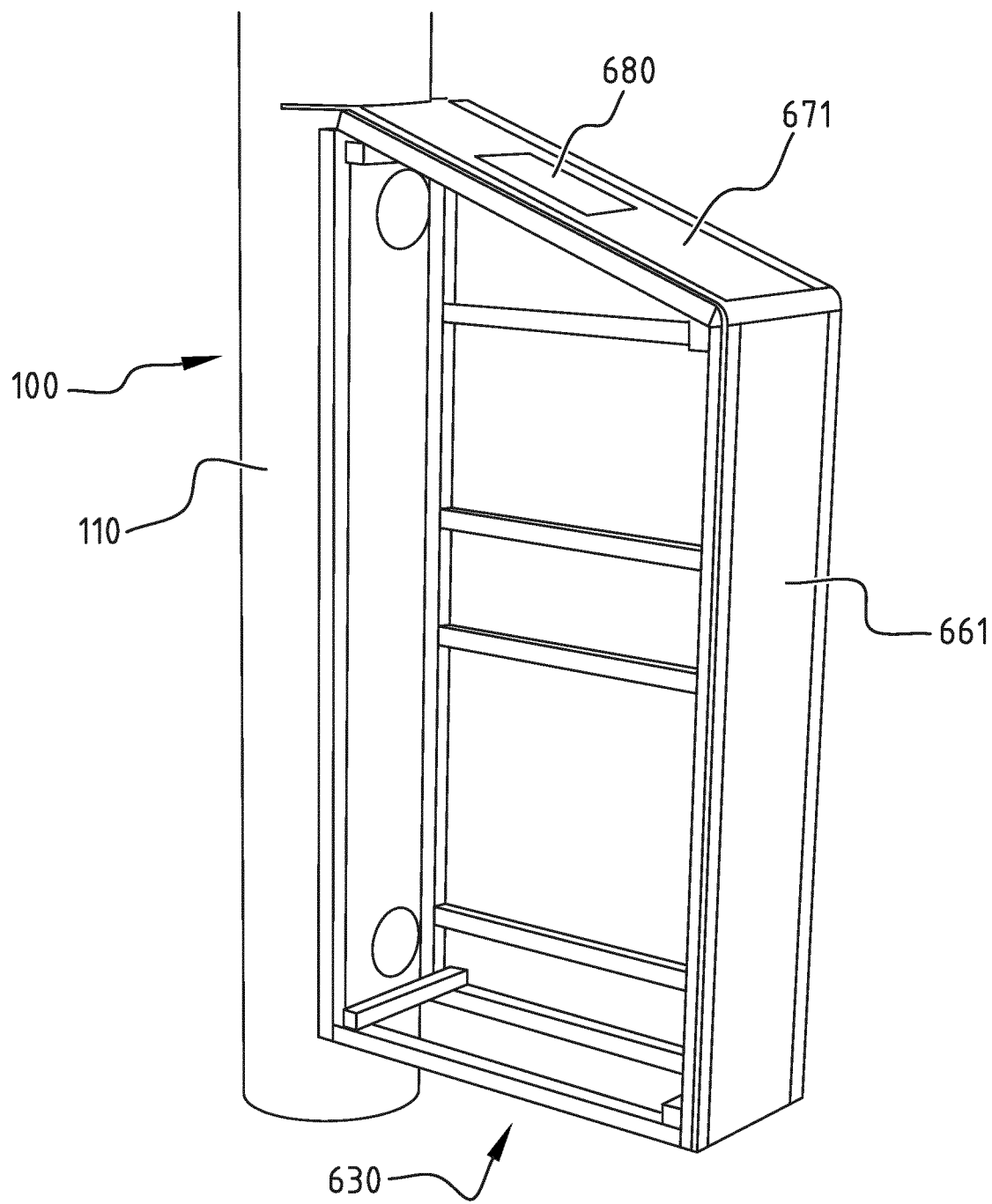
FIG. 5 is a schematic perspective view of an exemplary embodiment of a base station module with one panel of the housing, but without the side panels and without the base station circuitry.

In the illustrated embodiment of FIGS. 2 and 5 the housing 610 of the base station module 600 has an inclined upper surface 671, said upper surface sloping downward away from the support pole 100, wherein a display 680 and/or a battery charger and/or a sensor and/or a button and/or any other human interface devices (see also the examples given below) may be integrated in the inclined upper surface 671. In other embodiments the upper surface 671 may be a horizontal surface or a curved surface.

In the exemplary embodiments described above module 600 is a base station module. However, this module 600 may also be used to house different circuitry in addition or instead of base station circuitry. Examples of other functional circuitry which may be included in such a module in addition to or instead of the base station circuitry, are any one or more of the following:

power management circuitry comprising e.g. one or more of: a power meter, a fuse, a line protection, a circuit breaker, an electrical connection for multiple power lines, a clock, an astroclock, a power supply module, an PLC, a computer, a communication module, display circuitry, etc.; preferably the power management circuitry is configured to manage the provision of power to multiple lamp posts, preferably at least three lamp post, e.g. more than ten lamp posts. In such embodiments power connection cables pass from the functional module through the support pole to other lamp posts, e.g. underground.

telecommunication circuitry which can comprise at least one of: an optical fiber connection, a fiber to copper interface, a fiber patch panel, a modem, a router, a switch, a patch panel, a network video recorder (NVR), a computer;

audio system management circuitry which can comprise at least one of: an amplifier, a transformer, a media player (connected to network or not), electrical connections for multiple loudspeaker lines, a computer;

WiFi circuitry, wherein an antenna for receiving WiFi signals may be integrated either in the functional module or in a separate antenna module as in the exemplary embodiment of the lamp post with a base station module;

charger circuitry, e.g. phone/computer/tablet charger circuitry or vehicle charger circuitry;

an environmental sensor such as a microphone, or a detector of $CO_2$, $NO_x$, smoke, etc., and the associated circuitry;

a human interface device (HID) and the associated circuitry, e.g. a camera, a loudspeaker, a button, etc.

Figure 7:
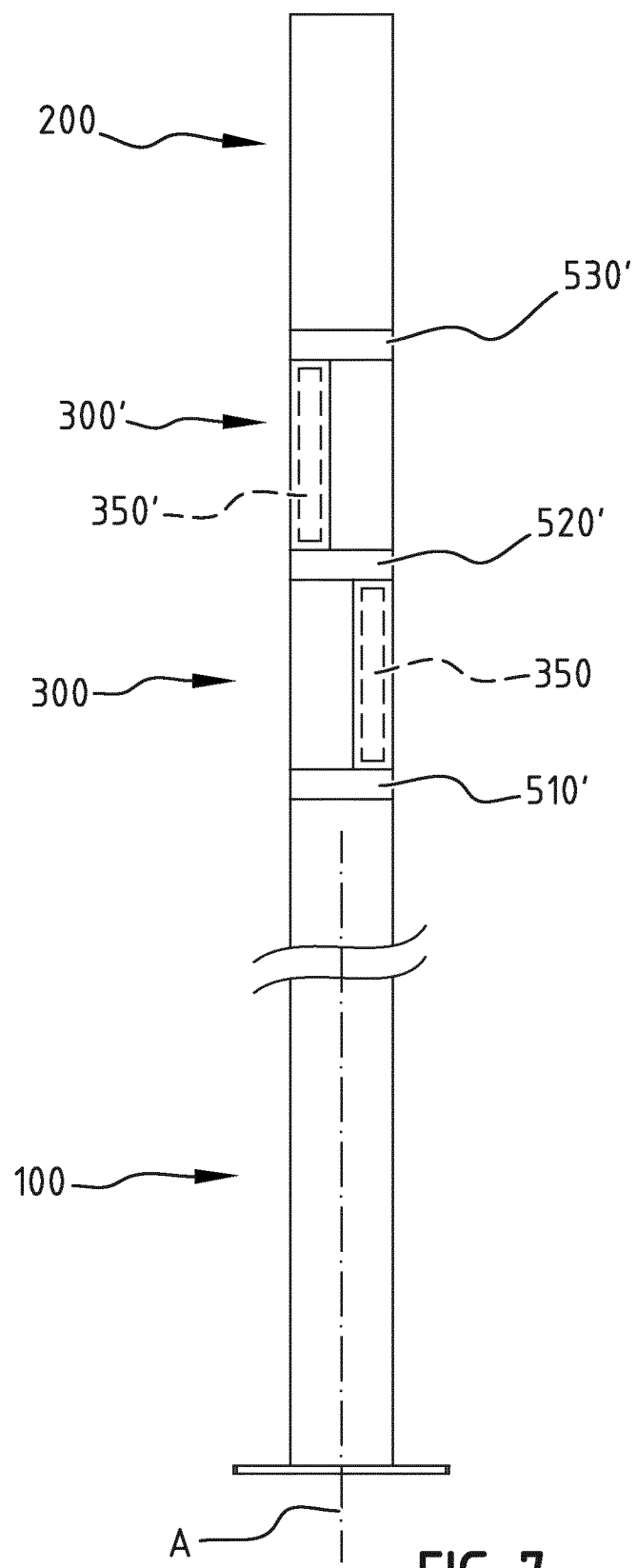
FIG. 7 illustrates schematically another exemplary embodiment of a lamp post of the invention.

FIG. 7 illustrates schematically an exemplary embodiment with two antenna pole modules. The lamp post comprises a support pole 100; a light pole module 200 comprising a light source; and a first and a second antenna pole module 300, 300'. The first and a second antenna pole module 300, 300' are arranged one above the other seen in an axial direction of the support pole 100 and are supported by the support pole 100. The first antenna pole module 300 comprises a first housing and a first directional antenna 350 arranged in said first housing and configured for receiving and emitting cellular data. The first antenna pole module 300 may be implemented e.g. as described above referring to FIG. 6. The second antenna pole module 300' may be the same or similar to the first antenna pole module 300, and comprises a second housing and a second directional antenna 350' arranged in said second housing and configured for receiving and emitting cellular data. The first and second antenna pole module 300, 300' are rotatable around the axial direction A of the support pole 100, such that said first and second antenna pole module 300, 300' are orientable for orienting the directionality of the receiving and emitting of the first and second directional antenna. The light pole module 200, the first antenna pole module 300 and the second antenna pole module 300 may be arranged in variable order one above another, aligned with the support pole 100, wherein optionally further pole modules are inserted in line with the support pole 100. Optionally, the lamp post 100 further comprises a base station module (not shown) comprising base station circuitry; wherein the base station circuitry is coupled to the first and second directional antenna 350, 350'. Preferably the first and second antenna pole module 300, 300' are arranged in a position above the base station module. The first and second antenna pole module 300, 300' may be arranged between the base station module and the light pole module 200', seen in the axial direction of the support pole 100. The base station module may be implemented according to any one of the embodiments described above.

It is further noted that in embodiments of the invention base station functionalities and/or other functionalities may be either included in a module like base station module 600 fixed to the support pole, or in one or more pole modules supported by the support pole 100 and aligned with the axial direction of the support pole 100. To that end such a module may have a larger diameter than the diameter of the support pole 100.

Whilst the principles of the invention have been set out above in connection with specific embodiments, it is to be understood that this description is merely made by way of example and not as a limitation of the scope of protection which is determined by the appended claims.

The invention claimed is:

1. A lamp post comprising a support pole; and a plurality of pole modules arranged one above the other along a vertical axis of the support pole, and supported by the support pole, said plurality of pole modules comprising:
a light pole module, said light pole module comprising a light source; and
a functional pole module, said functional pole module comprising a tubular portion configured for being aligned with the vertical axis of the support pole, a bracket protruding outwardly of said tubular portion, and a functional unit fixed to said bracket,
wherein the bracket comprises a compartment configured for housing electronic components, and
wherein the bracket comprises a door or removable cover providing access to the compartment.

2. The lamp post of claim 1, wherein the functional unit is a camera unit, and/or
wherein the bracket is provided with a removable connection interface configured for removably connecting the functional unit to the bracket.

3. The lamp post of claim 2, wherein the functional unit comprises an outer or inner screw thread, wherein the removable connection interface comprises an inner or outer screw thread matching with the screw thread of the functional unit, wherein the functional unit comprises a first connection plate, and wherein the removable connection interface comprises a second connection plate fixed to the first connection plate of the functional unit.

4. The lamp post according to claim 1, wherein the functional pole module is connected to one of the plurality of pole modules through a pole connector comprising a first round connector portion and a second round connector portion which together surround a round end portion of the functional pole module and an adjacent round end portion of said one pole module, and wherein the pole connector has an outer diameter which is substantially the same as an outer diameter of the support pole.

5. The lamp post according to claim 1, wherein any adjacent pole modules of the plurality of pole modules are interconnected through a pole connector comprising a first round connector portion and a second round connector portion which together surround round end portions of the adjacent pole modules, and wherein a lowest pole module of the plurality of pole modules is connected to the support pole through a pole connector comprising a first round connector portion and a second round connector portion which together surround a round end portion of the lowest pole module and an adjacent round end portion of the support pole.

6. The lamp post according to claim 1, wherein the support pole and the tubular portion of the functional pole module have an outer diameter which is substantially the same, and wherein the bracket of the functional pole module is directed outwardly and slightly upwardly such that an angle between the bracket and a horizontal is between 1° and 10°.

7. The lamp post according to claim 1, wherein the bracket is a hollow bracket, and wherein at least one connection line extends from the functional unit through the bracket and the tubular portion, to an interior space of the support pole, wherein the support pole is hollow, and wherein the support pole is provided with a removable door providing access to an interior space of said support pole.

8. The lamp post according to claim 7, wherein the bracket is provided with a removable connection interface configured for removably connecting the functional unit to the bracket, and wherein the connection line comprises an electrical and/or electronic and/or optical connector at said removable connection interface.

9. The lamp post according to claim 1, wherein the bracket has a length in a length direction protruding outwardly of the tubular portion, and a width extending in a direction perpendicular to an axial direction of the tubular portion and perpendicular to the length direction, said width being inferior to an external diameter of the tubular portion, and wherein the length is between 20 cm and 70 cm.

10. The lamp post according to claim 1, wherein the functional pole module is rotatable around an axis of the support pole, such that said functional pole module is orientable for orienting the directionality of the bracket.

11. The lamp post according to claim 1, wherein the light source comprises a plurality of light emitting diodes, and a driver for driving the plurality of light emitting diodes.

12. The lamp post according to claim 1, wherein the plurality of pole modules comprises an additional pole module, wherein the light pole module, the functional pole module, and the additional pole module are arranged in variable order one above another, aligned with the support pole, and wherein one or more further additional pole modules are inserted in line with the support pole.

13. The lamp post according to claim 1, wherein the bracket and the tubular portion are formed as one integral part, wherein the bracket is formed as a tubular bracket section, wherein a connecting tube is fitted in or around said tubular bracket section, and wherein the functional unit is fixed to the connecting tube.

14. The lamp post according to claim 1, wherein an intercom interface is provided in or to the support pole, wherein said intercom interface is configured to communicate through IP or SIP (Session Initiation Protocol), wherein said intercom interface comprises an audio and/or video intercommunication module, and wherein the lamp post further comprises a control and communication unit configured for obtaining raw data from the functional unit and for outputting said raw data or processed data derived from said raw data.

15. A video surveillance system, comprising a plurality of lamp posts according to claim 14 and a remote management subsystem configured to receive the raw or processed data from the plurality of lamp posts and to send audio, video, or alarm data to said plurality of lamp posts.

16. The lamp post according to claim 1, further comprising a seal between the door or removable cover and a circumferential edge of the compartment.

17. The lamp post according to claim 1, further comprising a first cable gasket arranged in a first passage between the tubular portion and the compartment, wherein a cable passes from the tubular portion through the first cable gasket to the compartment, and further comprising a second cable gasket arranged in a second passage between the compartment and the functional unit, wherein a cable passes from the compartment through the second cable gasket to the functional unit.

18. The lamp post of claim 17, wherein the bracket is provided with a removable connection interface configured for removably connecting the functional unit to the bracket, wherein the removable connection interface comprises the second passage between the compartment and the functional unit, wherein the removable connection interface comprises a first tubular portion configured for receiving the second cable gasket and a second tubular portion provided with a screw thread, and wherein the first or second cable gasket comprises a substantially cylindrical sealing body with one or more through-holes for one or more cables, and with one or more cuts extending between the cylindrical outer surface of the substantially cylindrical sealing body and each through-hole, said one or more cuts allowing for a cable to be brought in each through-hole.

19. A functional pole module for use in the lamp post according to claim 1.

\* \* \* \* \*